C. H. HOWARD & H. M. PFLAGER.
TRUCK CONSTRUCTION.
APPLICATION FILED NOV. 25, 1912.
1,080,559.
Patented Dec. 2, 1913.
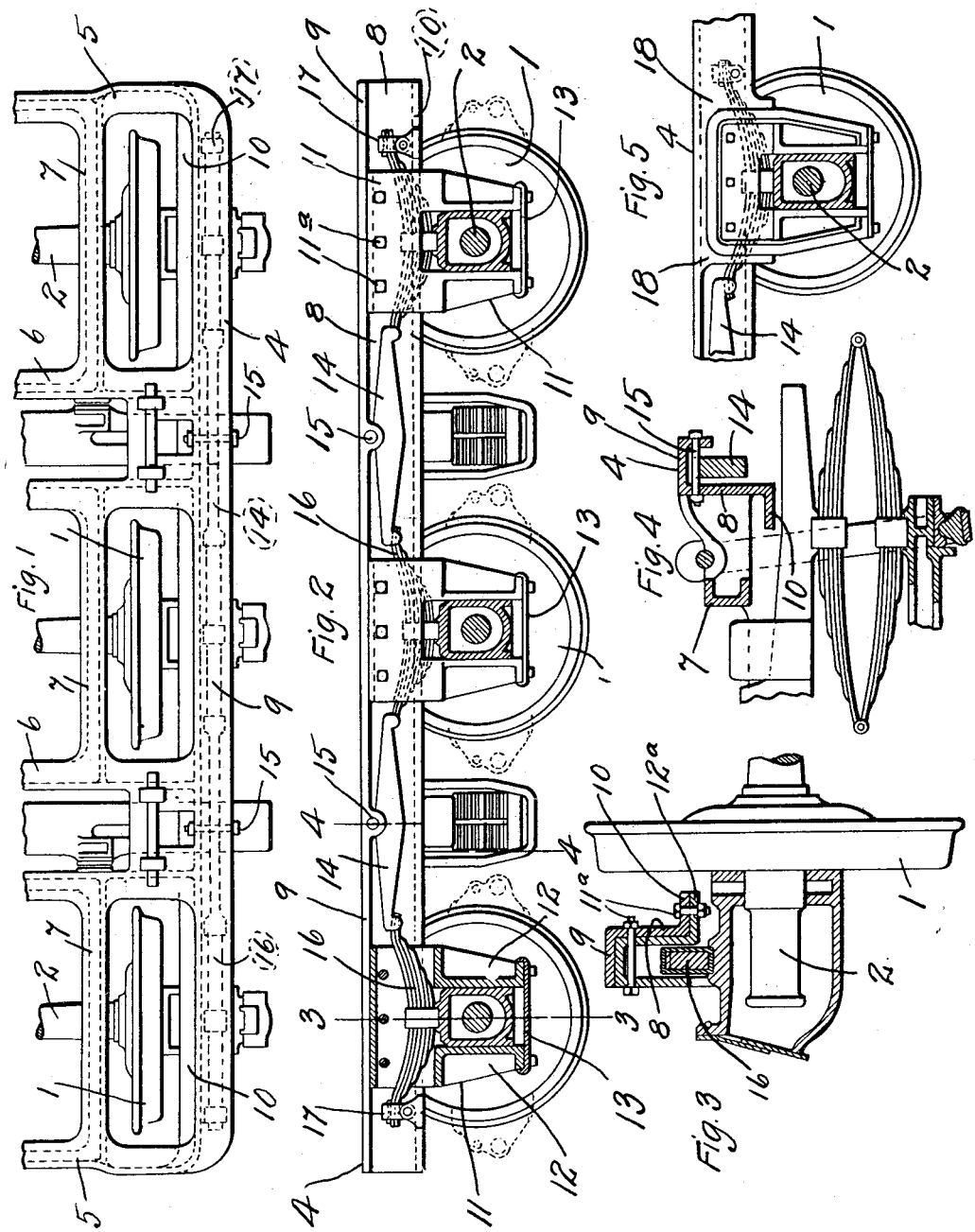
Witnesses
Inventors
Clarence H. Howard
Harry M. Pflager
By  Atty.

UNITED STATES PATENT OFFICE.

CLARENCE H. HOWARD AND HARRY M. PFLAGER, OF ST. LOUIS, MISSOURI, ASSIGNORS TO DOUBLE BODY BOLSTER COMPANY, OF ST. LOUIS, MISSOURI, A CORPORATION OF NEW JERSEY.

TRUCK CONSTRUCTION.

1,080,559. Specification of Letters Patent. Patented Dec. 9, 1913.

Application filed November 25, 1912. Serial No. 733,416.

*To all whom it may concern:*

Be it known that we, CLARENCE H. HOWARD and HARRY M. PFLAGER, citizens of the United States, residing at the city of St. Louis, State of Missouri, have invented a certain new and useful Improvement in Truck Construction, of which the following is a full, clear, and exact description, such as will enable others skilled in the art to which it appertains to make and use the same, reference being had to the accompanying drawings, forming part of this specification, in which—

Figure 1 is a top plan view of the side portion of a truck of our improved construction. Fig. 2 is a side elevational view of a truck with parts thereof in vertical section. Fig. 3 is an enlarged detail section taken approximately on the line 3—3 of Fig. 2. Fig. 4 is an enlarged detail section taken approximately on the line 4—4 of Fig. 2. Fig. 5 is a side elevational view of a portion of a truck and showing a modified construction of the wheel piece.

Our invention relates generally to railway car truck construction, and more specifically to a new and improved construction and arrangement of the truck frame side rails or wheel pieces and the truck equalizing members, and this application should be read in connection with an application on truck construction filed by us November 18th, 1912, Serial No. 732,099.

The principal object of our present invention is to produce a truck wherein the equalizing members are disposed and combined with parts of the truck frame so as to in no wise interfere with the free inspection and repair of the brakes, brake heads and other parts of the truck equipment within the truck frame.

Further objects of our invention are to materially increase the strength of the truck without increasing the weight thereof, to produce increased flexibility of the truck, to equalize the distribution of weight upon all of the wheels of the truck, and to arrange and dispose the equalizing members wholly above the journal boxes of the truck and yet keep well within a limited space between the tops of the track rails and the top of the truck frame.

For the purpose of illustrating our invention, we have shown it applied to a six-wheel truck, but it will be readily understood that the same arrangement can be employed on trucks having other wheel arrangements.

Referring by numerals to the accompanying drawings, 1 designates the wheels mounted on the usual axles 2, the ends of which latter are journaled in suitable boxes 3. Our improved truck frame as shown is formed in a single piece, preferably by casting, and comprises side members or wheel pieces 4, flanged end rails 5, flanged cross transoms 6, and flanged wheel guards 7, which latter in some instances may be dispensed with. The wheel pieces 4 are substantially Z-shape in cross section and comprise a vertically disposed web 8, an outwardly projecting top flange 9, and an inwardly projecting bottom flange 10. By such construction, the strength of the truck frame is materially increased and the flanged wheel pieces are formed so as to accommodate the equalizing members forming a part of the truck construction.

11 designates pedestals, the upper portions of which are formed substantially box shape in cross section and each pedestal being provided with a pair of jaws 12 which extend downward on the sides of the journal box in the usual manner and the lower ends of these jaws are united by a tie strap 13. The upper box shaped portion of each pedestal occupies a position immediately against the vertical web 8 and beneath the top flange 9 and said pedestal being fixed to the wheel piece in any suitable manner, preferably by means of bolts 11$^a$. If desired, an inwardly projecting flange 12$^a$ may be formed integral with each pedestal which flange extends beneath and is fixed to the inwardly projecting flange 10 of the wheel piece.

Positioned beneath the outwardly projecting top flange of each wheel piece and between the vertically disposed webs 11 are rigid equalizing members 14, the same being fulcrumed at 15 upon the flange 9. The ends of these rigid equalizing members 14 engage the ends of half elliptic springs 16, the same resting upon the journal boxes 3 and forming the flexible equalizing members. The central portion of the bottom plate or wall of the box shaped upper portion of each pedestal is cut away so as to permit the central portion of each flexible equalizer to rest or bear upon the top of the corresponding journal box. At the extremities of the wheel piece, the outer ends of the springs are engaged by suitable links 17, the same being pivoted to the wheel piece.

By virtue of the construction just described, the truck frame is yieldingly supported with respect to the journal boxes and wheels, and thus a flexible and universal equalization of the weight of the truck and parts carried thereby upon the different pairs of wheels is obtained. By thus increasing the flexibility of the truck, the riding movement of the car is made comparatively easy, and by locating the equalizing members against the sides of the wheel pieces and immediately below the top flanges 9 thereof, the entire lower portion of the truck is practically unobstructed and free to inspection and repairs.

By constructing the wheel pieces substantially Z-shape in cross section throughout their length, a very strong and rigid construction is provided, and the equalizing members arranged against the vertical webs of said wheel piece and beneath the top flange thereof are readily accessible for inspection and repair.

In Fig. 5, we have shown a modified construction wherein a vertically disposed web or plate 18 is formed integral with the top flange 9 immediately over and adjacent to the journal boxes which construction materially strengthens the wheel piece over the journal boxes and provides a vertically disposed wall to which the upper portion of the pedestal may be fixed.

We are aware that arrangements of the parts other than those herein shown and described may be made without departing from the spirit of our invention, and it is intended that the scope of our invention as set forth in the claims shall be construed to include all obvious changes and arrangements.

We claim:

1. The combination with a car truck frame having wheel pieces lying wholly above the journal boxes of the truck, which wheel pieces are provided with outwardly presented top flanges, and a series of equalizing members arranged adjacent to the vertical webs of the wheel pieces and between the journal boxes and the flanges thereof.

2. The combination with a car truck frame having flanged wheel pieces lying wholly above journal boxes of the truck, a series of flexible equalizing members mounted on the journal boxes of the truck, and rigid equalizing members fulcrumed on the flanges of the wheel pieces and coöperating with said flexible equalizing members.

3. In a car truck, the combination with wheel carrying axles and journal boxes, of a truck frame having wheel pieces lying wholly above the axles and journal boxes, which wheel pieces are provided with outwardly projecting flanges near their tops, equalizing bars positioned beneath said flanges and fulcrumed thereon, and equalizing springs supported by the journal boxes and engaging said equalizing bars.

4. In truck construction, the combination with wheel carrying axles and journal boxes, of a truck frame having wheel pieces which are Z-shape in cross section, and a series of equalizing members positioned between the journal boxes and the top flanges of the wheel pieces.

5. In a truck construction, the combination with a series of wheel carrying axles and journal boxes, of a truck frame having wheel pieces which are Z-shape in cross section, and a series of alternately arranged flexible and rigid equalizing members arranged between the journal boxes and the top flanges of the wheel pieces for yieldingly supporting said truck frame.

6. In a truck construction, the combination with a series of wheel carrying axles and journal boxes, of a truck frame having wheel pieces each comprising a vertically disposed web and a pair of horizontally disposed flanges projecting in opposite directions, and a series of equalizing members arranged between the journal boxes and the upper flanges of the wheel pieces for yieldingly supporting said truck frame.

In testimony whereof we hereunto affix our signatures in the presence of two witnesses, this 19th day of November, 1912.

CLARENCE H. HOWARD.
HARRY M. PFLAGER.

Witnesses:
FRED H. BLANKENHORN,
HAL C. BELLVILLE.